(12) United States Patent
Hadi et al.

(10) Patent No.: US 6,749,186 B2
(45) Date of Patent: Jun. 15, 2004

(54) HYDRAULIC BUSHING WITH SPRINGS IN PARALLEL

(75) Inventors: Rod G. Hadi, South Lyon, MI (US); Bjoern Oppermann, Ann Arbor, MI (US); Andrew James Kropp, Coloma, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/324,157

(22) Filed: Dec. 19, 2002

(65) Prior Publication Data
US 2003/0137088 A1 Jul. 24, 2003

Related U.S. Application Data
(60) Provisional application No. 60/342,272, filed on Dec. 19, 2001.

(51) Int. Cl.$^7$ ................................................ F16F 5/00
(52) U.S. Cl. ............................................. 267/140.12
(58) Field of Search .................... 267/140.12; 180/300, 180/312; 248/562, 566

(56) References Cited

U.S. PATENT DOCUMENTS 5,037,073 A  *  8/1991  Matsumoto et al. ... 267/140.11
5,286,011 A  *  2/1994  Strand ................... 267/140.12
6,419,215 B1 *  7/2002  Johnson et al. ............. 267/292
2003/0137087 A1 *  7/2003  Hadi et al. ............. 267/140.12

* cited by examiner

Primary Examiner—Christopher P. Schwartz
(74) Attorney, Agent, or Firm—Donald A. Wilkinson; Ronald W. Wangerow

(57) ABSTRACT

A hydraulic bushing forms a mount between a first component and a second component by including a spring portion connected between a core and an inner structure. The spring portion includes a first spring portion for defining hydraulic fluid cavities and a fluid channel extending between the cavities, with the cavities located about a first portion of the core, and a second spring portion formed of microcellular polyurethane about a second portion of the perimeter. The first spring portion and the second spring portion are located in parallel to one another. In this way, vibrations of a load transferred through the hydraulic bushing between the core and the inner support structure can be damped at a predetermined low frequency by the rubber with hydraulic fluid cavities, while still allowing for isolating of higher frequencies by the microcellular polyurethane portion of the spring.

20 Claims, 1 Drawing Sheet

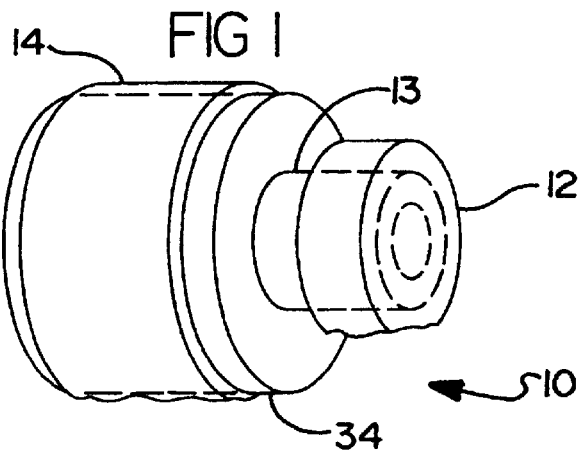
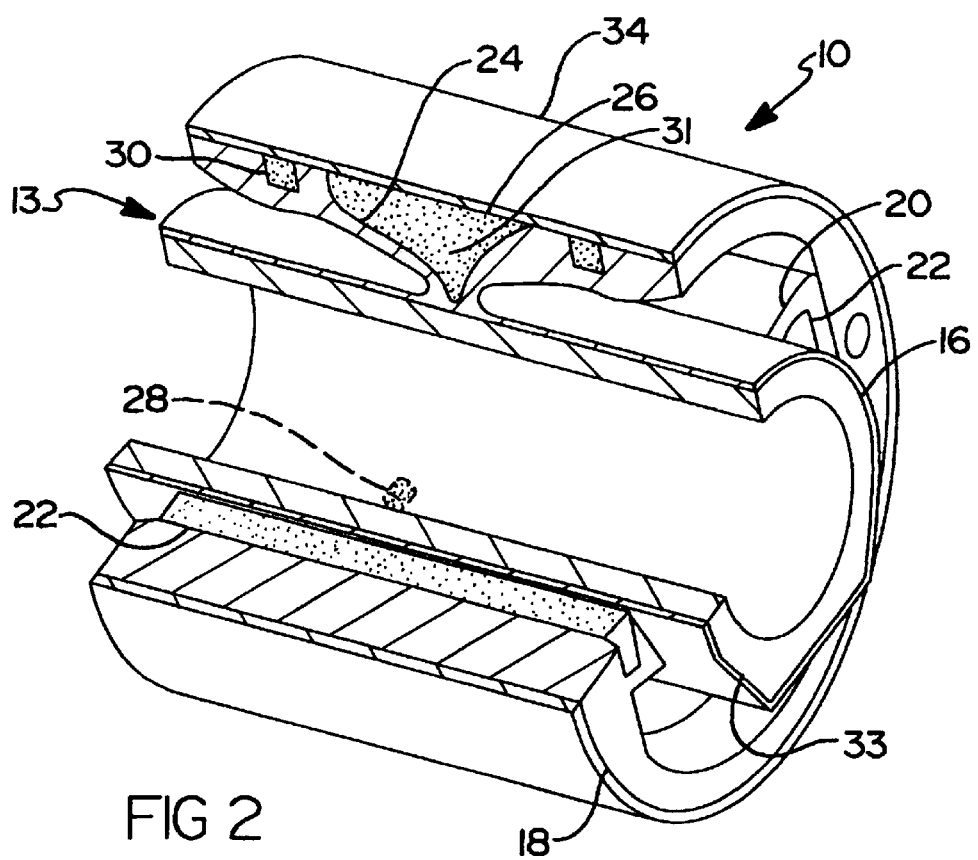

HYDRAULIC BUSHING WITH SPRINGS IN PARALLEL

CROSS REFERENCE TO RELATED APPLICATIONS

This claims the benefit of U.S. provisional patent application identified as application No. 60/342,272, filed Dec. 19, 2001.

BACKGROUND OF INVENTION

This invention relates in general to hydraulic bushings, and more particularly to hydraulic bushings tuned to reduce transmission of vibrations therethrough.

A typical application for hydraulic bushings (or mounts) is to locate them between components where a reduction in transmitted vibrations and/or the vibration of one of the components should be damped in a specific frequency range are desired. For example, engine mounts or suspension mounts in a vehicle, which are located between an engine and a vehicle chassis, or between a suspension and a vehicle chassis, respectively. A typical hydraulic bushing employed as a vehicle suspension mount includes an inner core connected to an inner support structure, commonly known as an inner ring, by an elastomeric material to form an assembly—with the assembly being received in a housing. The housing is,typically mounted to a component of the chassis, while the core is typically mounted to a component of the suspension. The elastomeric material is typically all rubber since the rubber is an elastomeric material with good sealing properties for retaining hydraulic fluid and is easy to mold into a desired shape. The rubber portion includes cavities with channels extending between them. A hydraulic fluid is provided in the cavities and sealed-in by the rubber. The cavities, channels and fluid, in conjunction with the rubber, are designed (i.e. tuned) to damp a particular low frequency vibration.

With this bushing, then, when the suspension or chassis receives a vibration at the tuned frequency, the hydraulic fluid in the suspension mount that is displaced through the channel between the desired chambers is resonating in the channel and damps the vibration, thus reducing the vibration. This type of damping is most effective for low frequencies with relatively large amplitudes, for example, in the range of 10–40 hertz. However, under relatively high frequency excitation, the hydraulic fluid behaves more like a solid, which significantly increases the overall dynamic stiffness of the bushing. Consequently, it increases the transmissibility of the high frequency vibrations through the mount, which is detrimental to the intended functionality of the mount.

Thus, it is desirable to provide a hydraulic bushing that can be employed as an engine or suspension mount, with the bushing tuned to reduce vibrations at a given lower frequency, while still maintaining a relatively lower dynamic stiffness of the mount assembly under relatively high frequency oscillations.

SUMMARY OF INVENTION

In its embodiments, the present invention contemplates a hydraulic bushing adapted to form a mount and transfer load between a first component and a second component. The hydraulic bushing includes a core having a perimeter, and an inner support structure surrounding and spaced from the perimeter. The hydraulic bushing also includes a spring portion connected between the core perimeter and the inner support structure, with the spring portion including a first spring portion formed of rubber and defining hydraulic fluid cavities and a fluid channel extending between the cavities, with the cavities located about a first portion of the perimeter, and a second spring portion formed of microcellular polyurethane about a second portion of the perimeter, whereby the first spring portion and the second spring portion are located in parallel.

An embodiment of the present invention also contemplates a method of damping vibrations of a load transferred through a hydraulic bushing between a core and an inner support structure, the method comprising the steps of: transferring a first portion of the load through a first spring portion that is made of microcellular polyurethane; and transferring a second portion of the load through a second spring portion, with the second spring portion including rubber defining hydraulic fluid cavities and a fluid channel extending between the cavities, and a hydraulic fluid located in the hydraulic fluid cavities and the channel.

An advantage of the present invention is that the hydraulic bushing can be tuned to reduce transmitted vibrations at a relatively lower frequency, while still maintaining a lower dynamic stiffness at relatively higher frequencies than a hydraulic bushing with an all rubber support structure between the inner core and the inner support structure. That is, the present invention improves the vibration isolation at relatively higher frequencies.

The present invention is particularly advantageous at improving the vibration isolation when the relatively high frequency excitations have a relatively high amplitude.

Another advantage of the present invention is that microcellular polyurethane (MCU) can be used to isolate relatively high frequency vibrations while still allowing the rubber to seal in the hydraulic fluid.

BRIEF DESCRIPTION OF DRAWINGS

FIG. 1 is a schematic, perspective view of a hydraulic mount located between a component of a vehicle suspension and a component of a vehicle chassis in accordance with the present invention; and FIG. 2 is a perspective, partial sectional view of a hydraulic bushing in accordance with the present invention.

DETAILED DESCRIPTION

FIGS. 1–2 illustrate a hydraulic suspension mount 10, configured to mount between a component 12 of a vehicle suspension and a component 14 of a vehicle chassis in a conventional fashion know to those skilled in the art. The hydraulic suspension mount 10 includes a bushing assembly 13. The bushing assembly 13 includes a core 16, preferably made of metal, and an inner support structure 18 generally surrounding the core and bonded to the core via an elastomeric spring portion 20. Located around an outer surface of the inner support structure 18 is a housing 34, which is typically formed of metal.

The elastomeric spring portion 20 includes a microcellular polyurethane (MCU) portion 22, effectively forming a first spring, and a rubber portion 24. The rubber portion 24 defines a first hydraulic fluid cavity 26 and a second hydraulic fluid cavity 28 located on an opposite side of the core 16 from cavity 26, the location of which is generally illustrated in dashed lines in FIG. 2. The dashed line illustration of fluid cavity 28 is illustrative of the location but not necessarily the size or shape of the cavity 28. A fluid channel 30 connects the two hydraulic cavities 26, 28. Hydraulic fluid is completely contained within the cavities 26, 28 and channel 30 of the rubber portion 24, without any containment by the MCU because MCU is an open cell material. Being an open cell material, the hydraulic fluid 31 would leak if the MCU were used to seal in the fluid. The rubber portion 24, along with the hydraulic fluid 31 in the cavities 26, 28 and channel 30, form a second spring with hydraulic damping.

The elastomeric spring portion 20 is formed with both the rubber portion 24 and the MCU portion 22 in order to allow the bushing assembly 13 to be tuned to damp a particular relatively low frequency excitation, while the MCU portion 22 will allow the elastomeric spring portion 20 to have an overall lower dynamic stiffness at the higher frequencies than if the entire elastomeric spring portion 20 was rubber with hydraulic fluid as a damper.

Moreover, the elastomeric spring portion 20 is formed with the MCU portion 22 and the rubber portion 24 located to cause them to function in parallel—that is, the MCU portion 22 and the rubber portion 24 alternate circumferentially around a perimeter 33 of the core 16 as they form the elastomeric spring portion 20, with both capable of transmitting load from/to the inner support 18 directly to/from the core 16. Consequently, both transfer a certain portion of the load and may isolate vibrations as that portion of the load transfers between the core 16 and the inner support structure 18. This parallel arrangement is particularly advantageous when the operating environment of the bushing assembly 13 is such that it will be subjected to relatively high frequency excitations which have a relatively high amplitude for that range of frequency.

The hydraulic bushing 10 is preferably formed by molding the rubber spring portion 24 and the inner support structure 18 about the perimeter 33 of the core 16. The mold (not shown) in which the molding is accomplished includes portions that will create voids for the hydraulic fluid cavities 26, 28 and channel 30 as well as the MCU portions 22. This molding process will not be discussed in any detail as it is well known to those skilled in the art. Preferably, the MCU portions 22 are molded separately, and then placed in the appropriate preformed voids of the elastomeric spring portion 20. Alternatively, MCU material may be injection molded into the appropriate voids in the elastomeric spring portion 20 to form the MCU portions 22. This subassembly is then assembled into the housing 34, preferably by a press fitting operation. The hydraulic fluid 31 is injected into the cavities 26, 28 and channel 30.

In operation, as an excitation is introduced, for example in the core 16, it transfers from the core 16 to the housing 34. A portion of the load transfers through the MCU portion 22 and into the inner support structure 18 and then the housing 34, while a second portion of the load transfers through the rubber portion 24 (and hydraulic fluid), to the inner support structure 18 and then the housing 34. If the excitation force is at the low frequency to which the rubber portion 24 and hydraulic fluid is tuned, then as the force is transferred, the hydraulic fluid will flow through the fluid channel 30 between the first fluid cavity 26 and the second fluid cavity 28, damping the oscillations at that frequency. The low frequency to which this is tuned may be, for example, a particular frequency somewhere in the range of 10 to 40 hertz. If the excitation force is at a relatively high frequency, for example, in the range of 500 to 1000 hertz, then, as the load at this excitation frequency is transmitted through the MCU portion 22, the MCU portion 22 will isolate these vibrations. So the MCU portion 22 helps to overcome the drawbacks of the hydraulic fluid and rubber portion 24 having a high dynamic stiffness at these relatively high frequencies.

While certain embodiments of the present invention have been described in detail, those familiar with the art to which this invention relates will recognize various alternative designs and embodiments for practicing the invention as defined by the following claims.

What is claimed is:

1. A hydraulic bushing adapted to form a mount and transfer load between a first component and a second component, the hydraulic bushing comprising:
   a core having a perimeter;
   an inner support structure surrounding and spaced from the perimeter; and
   a spring portion connected between the core perimeter and the inner support structure, with the spring portion including a first spring portion formed of rubber and defining hydraulic fluid cavities and a fluid channel extending between the cavities, with the cavities located about a first portion of the perimeter, and a second spring portion formed of microcellular polyurethane about a second portion of the perimeter, whereby the first spring portion and the second spring portion are located in parallel.

2. The hydraulic bushing of claim 1 wherein the first spring portion is adapted to receive hydraulic fluid in the hydraulic fluid cavities and the fluid channel to thereby damp a predetermined low frequency vibration as a first portion of the load is transferred between the core and the inner support structure.

3. The hydraulic bushing of claim 2 wherein the predetermined low frequency vibration is a frequency in the range of about 10 hertz to 40 hertz.

4. The hydraulic bushing of claim 3 wherein the second spring portion is adapted to isolate vibrations in the range of 500 hertz to 1000 hertz as a second portion of the load is transferred between the first component and the second component.

5. The hydraulic bushing of claim 1 wherein the second spring portion is adapted to isolate vibrations in the range of 500 hertz to 1000 hertz as a second portion of the load is transferred between the first component and the second component.

6. The hydraulic bushing of claim 1 wherein the core is made of metal.

7. The hydraulic bushing of claim 1 wherein the inner support structure is made of rubber and is integral with the first spring portion.

8. A hydraulic mount adapted to transfer load between a first component and a second component, the hydraulic mount comprising:
   a bushing having a core adapted to mount to the first component and having a perimeter; an inner support structure surrounding and spaced from the perimeter; and a spring portion connected between the core perimeter and the inner support structure, with the spring portion including a first spring portion formed of rubber and defining hydraulic fluid cavities and a fluid channel extending between the cavities, and a second spring portion formed of microcellular polyurethane wherein the first spring portion and the second spring portion are located in parallel; and
   a housing surrounding and mounted to the bushing, and adapted to mount to the second component.

9. The hydraulic mount of claim 8 wherein the first component is a portion of a vehicle chassis.

10. The hydraulic mount of claim 9 wherein the second component is a portion of a vehicle suspension.

11. The hydraulic mount of claim 8 wherein the first spring portion is adapted to receive hydraulic fluid in the hydraulic fluid cavities and the fluid channel to thereby damp a predetermined low frequency vibration as a first portion of the load is transferred between the first component and the second component.

12. The hydraulic mount of claim 11 wherein the predetermined low frequency vibration is a frequency in the range of about 10 hertz to 40 hertz.

13. The hydraulic mount of claim 12 wherein the second spring portion is adapted to isolate vibrations in the range of 500 hertz to 1000 hertz as a second portion of the load is transferred between the first component and the second component.

14. The hydraulic mount of claim 8 wherein the second spring portion is adapted to isolate vibrations in the range of 500 hertz to 1000 hertz as a second portion of the load is transferred between the first component and the second component.

15. The hydraulic mount of claim 8 wherein the core and the housing are made of metal.

16. The hydraulic mount of claim 8 wherein the inner support structure is made of rubber and is integral with the first spring portion.

17. A method of damping vibrations of a load transferred through a hydraulic bushing between a core and an inner support structure, the method comprising the steps of:
   transferring a first portion of the load through a first spring portion that is made of microcellular polyurethane; and
   transferring a second portion of the load through a second spring portion, with the second spring portion including rubber defining hydraulic fluid cavities and a fluid channel extending between the cavities, and a hydraulic fluid located in the hydraulic fluid cavities and the channel.

18. The method of claim 17 wherein the transferring of the first portion of the load is further defined by isolating high frequency vibrations as the load is transferred through the first spring portion.

19. The method of claim 18 wherein the transferring of the second portion of the load is further defined by damping a low frequency vibration as the load is transferred through the second spring portion.

20. The method of claim 17 wherein the transferring of the second portion of the load is further defined by damping a low frequency vibration as the load is transferred through the second spring portion.

* * * * *